United States Patent
Kitsunai et al.

(10) Patent No.: US 6,627,287 B2
(45) Date of Patent: Sep. 30, 2003

(54) OPTICAL DISC AND PROCESS FOR PRODUCING OPTICAL DISC

(75) Inventors: Takashi Kitsunai, Kitaadachi-gun (JP); Kazuo Murakami, Kawagoe (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 171 days.

(21) Appl. No.: 09/841,035

(22) Filed: Apr. 25, 2001

(65) Prior Publication Data

US 2001/0050140 A1 Dec. 13, 2001

(30) Foreign Application Priority Data

Apr. 27, 2000 (JP) .................................. P2000-127598

(51) Int. Cl.$^7$ ................................................ B32B 3/02
(52) U.S. Cl. ..................... 428/64.1; 428/64.4; 428/65.2
(58) Field of Search ............................... 428/64.1, 64.4, 428/65.2, 447, 913; 430/270.11, 495.1, 945; 369/283, 288

(56) References Cited

U.S. PATENT DOCUMENTS

| 5,432,258 | A |   | 7/1995 | Yoshimura |         |
|-----------|----|---|--------|-----------|---------|
| 6,337,118 | B1 | * | 1/2002 | Takehana  | 428/64.1 |
| 6,444,285 | B1 | * | 9/2002 | Murakami  | 428/64.1 |

FOREIGN PATENT DOCUMENTS

| EP | 1 000 993 A1 |   | 5/2000 |
| JP | 4-264166     |   | 9/1992 |
| JP | 11-193365    | * | 7/1999 |

* cited by examiner

*Primary Examiner*—Elizabeth Mulvaney
(74) *Attorney, Agent, or Firm*—Armstrong, Westerman & Hattori, LLP

(57) ABSTRACT

In order to provide an adhesive composition which can bond a substrate having a reflecting layer made of a silicon compound to which adhesion of conventional ultraviolet curable compositions is insufficient, an ultraviolet curable composition is provided which comprises: a silane coupling agent containing an epoxysilane or a (meth)acrylsilane; an ultraviolet curable compound; and a photopolymerization initiator.

6 Claims, No Drawings

OPTICAL DISC AND PROCESS FOR PRODUCING OPTICAL DISC

BACKGROUND OF THE INVENTION

1. Field of the Invention

The present invention relates to techniques for bonding two discs together, at least one of which has an information recording layer. More specifically, the present invention relates to an ultraviolet curable composition which can be used as an adhesive agent, an optical disc in which the ultraviolet curable composition is used, and a process for producing optical discs.

2. Description of Related Art

A DVD ("digital video disc" or "digital versatile disc") is manufactured by a method of bonding two discs together, at least one of which has an information recording layer. Use of an ultraviolet curable composition as an adhesive in this method has been considered.

In the case of read-only DVDs, the structure of the two bonded substrates may be one of the following types or the like, which can be properly selected depending on the application: a type in which two substrates are used which are each provided on one surface with irregularities called pits which correspond to information to be recorded, and further, as a reflecting film for a laser beam for reading information thereon, an aluminum layer, for example, is formed, so as to provide an information recording layer (DVD-10); a type in which, as one of the substrates, a transparent substrate having no information recording layer is used (DVD-5); a type in which one of the substrates is provided with a semitransparent reflecting layer made of gold or the like, and the other substrate is provided with an aluminum reflecting layer (DVD-9); and a type in which two substrates are bonded together, each of which has two information recording layers on one side (DVD-18).

A polycarbonate, a polymethylmethacrylate, an amorphous polyolefin, and the like are common as the material for the substrates of these optical discs.

At present, gold is mainly used for the semitransparent films for DVD-9 discs. However, since gold is a very expensive material, the use of silicon or silicon compounds has been considered for the purpose of reducing the cost ("silicon compounds" hereinafter refer to "silicon or silicon compounds" unless otherwise defined). Examples of silicon compounds which may be used for this purpose are silicon and silicon nitride. However, a problem was found that due to poor adhesion of a thin film of a silicon compound to an ultraviolet curable composition, which is used as an adhesive, in comparison with a metallic thin film such as gold, the substrate on which the film was formed and to which the other substrate was bonded using the ultraviolet curable composition may come off after being left for a long time under conditions of high temperature and high humidity. Therefore, an adhesive agent made of an ultraviolet curable composition which provides long-term stability of signals and which allows production of highly reliable bonded discs has been desired.

BRIEF SUMMARY OF THE INVENTION

The object of the present invention is to provide an ultraviolet curable composition which is most suitable for an adhesive agent for optical discs which,have a bonded structure. In particular, the object of the present invention is to provide an adhesive composition which can bond a substrate having a reflecting layer made of a silicon compound to which adhesion of conventional ultraviolet curable compositions is insufficient. Another object of the present invention is to provide an optical disc, as well as a production method therefor, in which the adhering surfaces have sufficient adhesion, and in particular, the adhering surface of a reflecting layer which is made of a silicon compound has strong adhesion.

As a result of the present inventors' diligent research aimed at attaining the above objects, the present inventors have found that the addition of a silane coupling agent containing an epoxy silane or a (meth)acrylsilane to the ultraviolet curable composition improves the adhesion of the bonded disc, particularly when the disc is a DVD-9 disc in which a silicon compound is used as a semitransparent film, and thus the present inventors achieved the present invention.

According to the present invention, an ultraviolet curable composition is provided which comprises a silane coupling agent containing an epoxysilane or a (meth)acrylsilane, the ultraviolet curable composition being useful as an adhesive agent in the production of optical discs in which two plastic substrates are bonded together, at least one of which is provided with a thin film of a reflecting layer as the outermost layer so that the surface of the reflecting layer provides an adhering surface. In addition, according to the present invention, an optical disc in which at least one of the substrates has a thin film of a reflecting layer and a production process for the optical disc are provided, wherein an ultraviolet curable composition which is used as an adhesive agent comprises a silane coupling agent containing an epoxysilane or a (meth)acrylsilane.

The "epoxysilane" and the "(meth)acrylsilane" in the present invention are silane coupling agents which have an epoxy group or a (meth)acryl group, which forms a chemical bond with an organic material, as well as a group, such as a methoxy group, an ethoxy group, and a silanol group, which forms a chemical bond with an inorganic material such as glass and metal.

In the ultraviolet curable composition according to the present invention, in order to obtain good adhesion, it is preferable that the amount of the silane coupling agent in 100 parts by weight of the ultraviolet curable composition be 0.1 to 5 parts by weight.

In general, some cases are known in which the addition of a silane coupling agent to an adhesive agent improves the adhesion thereof. However, a silane coupling agent containing an epoxysilane or a (meth)acrylsilane has never been used in an ultraviolet curable composition for bonding substrates for an optical disc. A silane coupling agent containing an epoxysilane or a (meth)acrylsilane, which is used in the present invention, not only improves adhesion for the above purpose, but also has an excellent durability under conditions of high temperature and high humidity. Such a silane coupling agent is suitable as an adhesive agent for a thin film of a silicon compound, on which water drops are readily formed under the above conditions due to its strong water repellency.

Accordingly, use of the ultraviolet curable composition of the present invention allows production of optical discs such as DVD-9 discs, which have a semitransparent reflecting layer made of a silicon compound on one of the disc substrates, having desirable properties such as excellent durability and reliability, which are evaluated by tests in a high temperature and high humidity.

DETAILED DESCRIPTION OF THE INVENTION

Embodiments of the present invention will be described in the following, on the basis of preferable modes.

In the preparation of the ultraviolet curable composition of the present invention, a silane coupling agent, an ultraviolet curable compound, and a photopolymerization initiator are used as essential components.

Preferable examples of silane coupling agents for the present invention are as follows: examples of epoxysilanes are β-(3,4-epoxycyclohexyl)ethyltrimethoxysilane, γ-glycidoxypropyltrimethoxysilane, and γ-glycidoxypropylmethyldiethoxysilane; and an example of (meth)acrylsilane is γ-methacryloxypropyltrimethoxysilane.

Such silane coupling agents are sold, for example, under the trade names of "KBE403" (γ-glycidoxypropylmethyldiethoxysilane), "KBM403" (γ-glycidoxypropyltrimethoxysilane), "KBM502" (γ-methacryloxypropylmethyldimethoxysilane), and "KBM503" (γ-methacryloxypropyltrimethoxysilane) by Shin-Etsu Silicones Co., Ltd, and can be obtained easily.

For the ultraviolet curable compound, monofunctional (meth)acrylate or polyfunctional (meth)acrylate can be used as a polymerizable monomer component. One type of ultraviolet curable compound alone or a combination of two or more types of ultraviolet curable compounds may be used. For describing the present invention, "(meth)acrylate" here refers to acrylate and methacrylate.

Examples of polymerizable monomers which can be used for the present invention are as follows:

examples of monofunctional (meth)acrylates are those having a substituent group such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, glycidyl, dimethylaminoethyl, diethylaminoethyl, isobornyl, dicyclopentanyl, dicyclopentenyl, and dicyclopentenyloxyethyl; and examples of polyfunctional (meth)acrylates are di(meth)acrylates such as 1,3-butylene glycol, 1,4-butanediol, 1,5-pentanediol, 3-methyl-1,5-pentanediol, 1,6-hexanediol, neopentylglycol, 1,8-octanediol, 1,9-nonanediol, tricyclodecanedimethanol, ethylene glycol, polyethylene glycol, propylene glycol, dipropylene glycol, tripropylene glycol, and polypropylene glycol; a di(meth)acrylate of tris(2-hydroxyethyl)isocyanurate; a di(meth)acrylate of a diol obtained by adding at least 4 mol of ethyleneoxide or propyleneoxide to 1 mol of neopentylglycol; a di(meth)acrylate of a diol obtained by adding at least 2 mol of ethyleneoxide or propyleneoxide to 1 mol of bisphenol A; a di- or tri(meth)acrylate of a triol obtained by adding at least 3 mol of ethyleneoxide or propyleneoxide to 1 mol of trimethylolpropane; a di(meth)acrylate of a diol obtained by adding at least 4 mol of ethyleneoxide or propyleneoxide to 1 mol of bisphenol A; trimethylolpropane tri(meth)acrylate; pentaerythritol tri(meth)acrylate; a poly(meth)acrylate of dipentaerythritol; an ethylene oxide modified phosphoric acid (meth)acrylate; and an ethylene oxide modified alkylated phosphoric acid (meth)acrylate.

A polymerizable oligomer may be used together with the polymerizable monomer. Examples of the polymerizable oligomer are polyester (meth)acrylate, polyether (meth)acrylate, epoxy (meth)acrylate, and urethane (meth)acrylate.

Any known conventional photopolymerization initiator which can cure the ultraviolet curable composition used, which is represented by a polymerizable oligomer and/or a polymerizable monomer, can be used as the photopolymerization initiator for the present invention. However, a molecular cleavage type or a hydrogen pull-off type is preferable for the present invention.

Benzoin isobutyl ether, 2,4-diethylthioxanthone, 2-isopropylthioxanthone, benzyl, 2,4,6-trimethylbenzoyldiphenylphosphineoxide, 2-benzyl-2-dimethylamino-1-(4-morpholinophenyl)-butane-1-on, bis(2,6-dimethoxybenzoyl)-2,4,4-trimethylpentylphosphineoxide, or the like can be preferably used as the photopolymerization initiator for the present invention. A molecular cleavage type photopolymerization initiator other than the above may be additionally used, such as 1-hydroxycyclohexyl phenyl ketone, benzoin ethyl ether, benzyl dimethyl ketal, 2-hydroxy-2-methyl-1-phenylpropane-1-on, 1-(4-isopropylphenyl)-2-hydroxy-2-methylpropane-1-on, and 2-methyl-1-(4-methylthiophenyl)-2-morpholinopropane-1-on. A hydrogen pull-off type photopolymerization initiator may also be additionally used, such as benzophenone, 4-phenylbenzophenone, isophthalphenone, and 4-benzoyl-4'-methyldiphenylsulfide.

With the above photopolymerization initiator, an amine which does not induce an addition reaction with the above polymerizable component, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone may be additionally used as a sensitizer. The above photopolymerization initiator and the sensitizer are preferably selected, as a matter of course, from those which have excellent solubility in the ultraviolet curable compound, and which do not inhibit the ultraviolet transmittance.

An ultraviolet curable composition which is a liquid at a temperature between an ambient temperature and 40° C. can be preferably used. Preferably no solvent is used, and even if a solvent is used, the amount thereof should be as small as possible. When the application of the above composition is carried out using a spin coater, the composition is preferably prepared so as to have a viscosity of 20 to 1000 mPa·s. If the thickness of the applied composition is intended to be comparatively thick, that is, 40 μm or thicker, for example, the composition is prepared so as to have a viscosity of 100 to 1000 mPa·s.

The composition of the present invention may be combined with other additives as necessity arises, such as a thermal polymerization inhibitor; an antioxidant represented by hindered phenol, hindered amine, and phosphite; and a plasticizer so as to improve various properties. The above additives are preferably selected from those which have excellent solubility in the ultraviolet curable compound, and which do not inhibit the ultraviolet transmittance.

In the following, preferred modes of the embodiments of optical discs in which substrates are bonded together using an ultraviolet curable composition according to the present invention are described.

First, one disc substrate made of any one of a polycarbonate, a polymethylmethacrylate, and an amorphous polyolefin, in which a 40–60 nm aluminum thin film is sputtered on pits which correspond to recorded information and another similar disc substrate in which a 10–30 nm semitransparent reflecting layer of a silicon compound is sputtered on pits which correspond to recorded information, are prepared.

Then, the above ultraviolet curable composition, to which a silane coupling agent containing an epoxysilane or a (meth)acrylsilane is added, is prepared.

The above composition is coated on the aluminum thin film surface of the disc substrate with the 40–60 nm aluminum thin film, and the disc substrate with the 10–30 nm semitransparent reflecting layer of a silicon compound is bonded such that the semitransparent reflecting layer is opposite the aluminum reflecting layer, to which the above composition has been applied. One side or both sides of the bonded disc are irradiated with ultraviolet rays to unite the substrates to form a DVD-9 disc. In view of adhesion, it is preferable that the bonded disc be irradiated with a flash of ultraviolet rays.

EXAMPLES

Next, the present invention will be described in detail through examples. However, the present invention is not limited to these examples. In the examples, "parts" indicates "parts by weight."

Example 1

15 parts of "UNIDIC V-5500" (manufactured by DAINIPPON INK AND CHEMICALS, INC.) as a bisphenol A type epoxy acrylate; 14 parts of urethane acrylate obtained by reacting 1 mole of polytetramethylene glycol (molecular weight 1000) with 2 moles of isophorone diisocyanate, and then with 2 moles of hydroxyethyl acrylate; 22 parts of tripropylene glycol diacrylate; 22 parts of 2-hydroxy-3-phenoxypropyl acrylate; 18 parts of ethylcarbitol acrylate; 1.5 parts of ethylene oxide-modified trimethylolpropane triacrylate; 0.2 parts of ethylene oxide-modified phosphoric acid methacrylate; 0.3 parts of ethyl dimethylaminobenzoate; 2 parts of 2,4,6-trimethylbenzoyldiphenylphosphine oxide and 4 parts of 1-hydroxycyclophenyl ketone as photopolymerization initiators; and 1 part of γ-glycidoxypropyltrimethoxysilane as a silane coupling agent were mixed and dissolved by heating at 60° C. for 1 hour to prepare a pale yellow transparent ultraviolet curable composition.

Example 2

By a process similar to that of Example 1 except for using 1 part of γ-methacryloxypropyltrimethoxysilane as the silane coupling agent, a pale yellow transparent ultraviolet curable composition was prepared.

Comparative Example 1

By a process similar to that of Example 1 except for not adding the silane coupling agent, a pale yellow transparent ultraviolet curable composition was prepared.

Comparative Example 2

By a process similar to that of Example 1 except for using 1 part of γ-aminopropyltriethoxysilane as the silane coupling agent, a pale yellow transparent ultraviolet curable composition was prepared.

Using the ultraviolet curable compositions obtained in the above Examples and Comparative Examples, the adhesion and durability of DVD-9 type bonded discs were evaluated by the test methods described below. The results are shown in Table 1.
<Test Methods: Adhesion and Durability Tests on DVD-9 Type Bonded Discs>

On a polycarbonate disc on which pits for recording information were formed and aluminum was sputtered to 50 nm, the above-described composition was coated using a dispenser, and this polycarbonate disc was overlaid with a polycarbonate disc on which a silicon compound was sputtered as a semitransparent film. Then, using a spin coater, the disc was spun at 1,500 $min^{-1}$ for 1 to 22 seconds so that the film thickness of the cured coating film would be about 50–60 $\mu$m. Then, using a "XENON FLASH IRRADIATION APPARATUS SBC-04" manufactured by USHIO INC., irradiation of the disc with 10 shots of ultraviolet rays at a voltage of 1,800 V was carried out in air from the side of the substrate with the silicon compound semitransparent film to make a DVD-9 type disc.

Evaluation of adhesion was carried out by forcefully separating the substrates in the bonded disc, and observing the conditions of the separated surfaces. That is, when the bonded disc was separated, if the aluminum reflecting layer came off together with the adhesive agent from the polycarbonate substrate, the rating was "good". If the reflecting layer did not come off from the substrate, the rating was "poor".

For the bonded disc, durability tests were conducted in which the bonded disc was left under conditions of a high temperature and high humidity environment of 80° C. and 95% RH for 96 hours in a temperature/humidity chamber "PR-2PK" manufactured by TABAI ESPEC CORP., and an evaluation of the signal properties before and after the durability test was performed. The disc which had been subjected to the durability tests was stored in a room in which the temperature and the humidity were adjusted to 23±5° C. and 50±5% RH. Three hours later, the appearance was visually observed, and 24 hours later, the properties of the signals were measured.

An evaluation of signal properties (measurement of error rates) before and after the durability tests was carried out using a "SDP-1000" manufactured by PULSTEC IND. CO., LTD., and the ratios of PI error rates before and after the test (the value after the durability test/the value before the durability test) were obtained. The maximum value was used as the measured value of the error rate. In general, since the error rate is dependent on the properties of individual disc substrates, the error rates of discs tend to vary, and it is difficult to compare initial values of error rates of bonded discs. However, error rates can be compared with a uniform standard using the relative ratios of the error rates before and after the durability test.

TABLE 1

|  | Example 1 | Example 2 | Comparative Example 1 | Comparative Example 2 |
| --- | --- | --- | --- | --- |
| DVD-9 durability (rate of increase in error rate) | 1.7 | 2.3 | 13 | No data available after test |
| Visual observation of appearance | Good | Good | Many water drops were observed | Substrates came apart during test |
| Adhesion | Good | Good | Poor | Substrates came apart during test |

The result of the tests on DVD-9 type bonded discs, in which a semitransparent film of a silicon compound was used, show that the optical discs of Examples 1 and 2, for which bonding was carried out using the ultraviolet curable composition of the present invention to which the silane coupling agent was added, exhibited good adhesion. In addition, even after the durability tests, the optical discs of Examples 1 and 2 had a good appearance, and the variation in properties of signals was very small. On the other hand, the optical disc of Comparative Example 1, for which bonding was carried out using the ultraviolet curable composition to which a silane coupling agent was not added, had poor adhesion and poor durability, and remarkably deteriorated the properties of signals. In addition, the optical disc of Comparative Example 2, in which an additive which differed from the silane coupling agent was added, was of poor practical use since the adhesion deteriorated remarkably, and the substrates came apart by themselves during the durability tests.

What is claimed is:

1. An optical disc in which two plastic substrates are bonded together using an ultraviolet curable composition between adhering surfaces of the substrates, at least one of the substrates being provided with a reflecting layer as the outermost layer so that the surface of the reflecting layer provides the adhering surface, the ultraviolet curable composition comprises:
   a silane coupling agent containing an epoxysilane or a (meth)acrylsilane in an amount of 0.1 to 5 parts by weight in 100 parts by weight of the ultraviolet curable composition;
   an ultraviolet curable compound; and
   a photopolymerization initiator.

2. An optical disc according to claim 1, wherein at least one of the adhering surfaces is a surface of the reflecting layer, which is made of silicon or a silicon compound.

3. An optical disc according to claim 2, wherein the plastic substrate comprises a polycarbonate, a polymethylmethacrylate, or an amorphous polyolefin.

4. A process for producing an optical disc comprising the step of bonding two plastic substrates together using an ultraviolet curable composition between adhering surfaces of the substrates, at least one of the substrates being provided with a reflecting layer as the outermost layer so that the surface of the reflecting layer provides the adhering surface, wherein the ultraviolet curable composition comprises:
   a silane coupling agent containing an epoxysilane or a (meth)acrylsilane in an amount of 0.1 to 5 parts by weight in 100 parts by weight of the ultraviolet curable composition;
   an ultraviolet curable compound; and
   a photopolymerization initiator.

5. A process for producing an optical disc according to claim 4, wherein at least one of the adhering surfaces is a surface of the reflecting layer, which is made of silicon or a silicon compound.

6. An optical disc in which two plastic substrates are bonded together using an ultraviolet curable composition between adhering surfaces of the substrates, at least one of the substrates being provided with a silicon or silicon compound reflecting layer as the outermost layer and surface of the reflecting layer being one of the adhering surfaces, the ultraviolet curable composition comprises:
   a silane coupling agent containing an epoxysilane or a (meth)acrylsilane in an amount of 1 part by weight in 100 parts by weight of the ultraviolet curable composition;
   a polymerizable monomer component in an amount of 67.3 parts by weight in 100 parts by weight of the ultraviolet curable composition;
   a polymerizable oligomer component in an amount of 29 parts by weight in 100 parts by weight of the ultraviolet curable composition and
   a photopolymerization initiator in an amount of 6.3 parts by weight in 100 parts by weight of the ultraviolet curable composition.

* * * * *